United States Patent [19]

Schweiger

[11] Patent Number: 4,797,249

[45] Date of Patent: Jan. 10, 1989

[54] PROCESS FOR PRECLUDING OR REDUCING THE DANGER TO A SYSTEM AND THE SURROUNDINGS THEREOF BY REACTIVE MIXTURES

[76] Inventor: Willy Schweiger, Am Mühlanger 81, D-8039 Puchheim, Fed. Rep. of Germany

[21] Appl. No.: 756,816

[22] Filed: Jul. 18, 1985

Related U.S. Application Data

[63] Continuation of Ser. No. 342,167, Jan. 25, 1982.

[30] Foreign Application Priority Data

Jan. 25, 1981 [EP] European Pat. Off. ......... 81100534.7

[51] Int. Cl.$^4$ ............................................... G21C 9/00
[52] U.S. Cl. ..................................... 376/279; 376/308
[58] Field of Search ............... 376/279, 277, 283, 300, 376/301, 305, 309, 310, 313, 316, 308

[56] References Cited

U.S. PATENT DOCUMENTS

| | | | |
|---|---|---|---|
| 3,889,707 | 6/1975 | Fay et al. | 376/283 |
| 4,407,774 | 10/1983 | Schretzmann et al. | 376/300 |
| 4,601,873 | 7/1986 | Jahn | 376/305 |

FOREIGN PATENT DOCUMENTS

| | | | |
|---|---|---|---|
| 2805476 | 8/1979 | Fed. Rep. of Germany | 376/308 |
| 0004640 | 2/1967 | Japan | 376/283 |
| 1092536 | 11/1967 | United Kingdom | 376/279 |

Primary Examiner—Deborah L. Kyle
Assistant Examiner—Richard W. Wendtland
Attorney, Agent, or Firm—Michael J. Striker

[57] ABSTRACT

A process for precluding or reducing the danger to a system or its surroundings by mixtures comprising reactive substances which react chemically and/or physically and the release of pollutants during an accident, in particular by the combustion of hydrogen in the containment of a nuclear power plant and/or by the release of fission products therefrom, wherein at least one portion of said reactive substances and/or pollutants are kept separately during system malfunction or are at least partially separated into two areas and kept separately there, or wherein a potentially dangerous reaction is stopped in a first, especially hazardous area by transferring at least one portion of at least one of said reactive substances into a second area.

8 Claims, 2 Drawing Sheets

PROCESS FOR PRECLUDING OR REDUCING THE DANGER TO A SYSTEM AND THE SURROUNDINGS THEREOF BY REACTIVE MIXTURES

This is a continuation of application Ser. No. 342,167, filed Jan. 25, 1982.

BACKGROUND OF THE INVENTION

This invention relates to a process in accordance with the preamble of patent claim 1.

DESCRIPTION OF THE PRIOR ART

Industrial technical equipment is frequently accommodated in closed rooms. In the event of a malfunction or accident a substance contained in a pipeline system of the equipment or in containers associated with the equipment, for example, may be discharged as a result of a rupture or leak. If the emerging substance can react chemically or physically with the atmosphere surrounding the equipment, this may result in a source of potential danger to the system. If the substance is a flammable liquid such as petrol (gasoline), alcohol or the like, or a flammable gas such as methane, hydrogen, etc, for instance, the danger of normal or explosive combustion increases the longer the substance escapes from the system. Hence, it is extremely important to reduce the source of potential danger as far as possible to avoid or at least limit if possible damage inflicted to the system, whereby the quantity of produced and released pollutants can be reduced as well. In particular, the possible danger of environmental pollution must be considered if an accident or malfunction in the system causes the space surrounding the system to be destroyed, thereby permitting large quantities or pollutants to be released into the environment.

Such problems also occur in nuclear power plants equipped with light-water reactors.

Light-water reactors comprise a primary coolant circuit containing "normal" water as the coolant. This coolant serves to moderate and remove the thermal energy supplied during nuclear fission. The thermal energy released by nuclear fission and absorbed by the coolant is supplied to turbines directly in boiling-water reactors and in pressurised-water reactors via a thermally coupled second circuit (secondary coolant circuit).

In constructing light-water reactors, accidents which cannot reliably be excluded are taken into consideration right from the beginning in such a way that, should an accident occur, at least partial systems of the light-water reactor will be shut down and emergency systems and auxiliary equipment, respectively, will be activated to convert the plant to a non-endangered condition. Such accidents are described as malfunctions which are taken into account during the reactor design and construction phase, and hereinafter will be termed "malfunctions accounted for".

The rupture of a primary pipe, also termed a LOCA (Loss Of Coolant Accident), is a "malfunction accounted for". The reactor experience emergency shutdown (scramming) in the event of such a rupture.

Due to the breakdown of the primary coolant circuit it is necessary to provide emergency cooling for the reactor core, since adequate heat will continue to be generated by the fission products formed during power production, in order to prevent an inadequately cooled core from melting completely under certain circumstances (melt-down). This thermal energy still produced by the fission products and the quantity of water stored in the primary circuit of the primary coolant system anyway as well as the thermal energy contained in this water cause a violent release of steam in the reactor containment and a pressure increase therein, since the water expands as it emerges from the primary circuit. Based on its design and construction, the reactor containment is designed for this excess pressure load.

Two types of reactor containments are differentiated and the typical application of them currently consists of the following combinations:

(a) a full-pressure reactor containment in a pressurised-water reactor (b) a reactor containment in the pressure reduction system of a boiling-water reactor.

A LOCA in the case of (a) causes the air located in the reactor containment to be initially displaced into the upper cupola of the reactor containment by the released steam, whilst the lower portion of the containment will fill almost exclusively with steam.

A LOCA in the case of (b) causes the major portion of the air lcoated in the so-called pressure chamber of the containment and a large amount of the steam to be temporarily transferred from this area of the containment into a second area, the socalled condensation chamber, which is fluid-dynamically connected to the containment. The steam conveyed through immersion pipes into the hydraulic seal of the condensation chamber is condensed there. The further course of the activity in the reactor containment is greatly dependent on the type of LOCA involved.

If the cooling means for emergency cooling of the reactor core fail partially or temporarily or are not completely effective during a LOCA, the result will be a build-up of high temperatures in the reactor core. If the temperature of the canning (cladding) of the reactor core exceed 800° C., intense exothermic oxidation occurs during which considerable quantities of hydrogen are generated within a period of minutes. The zirconium contained in the fuel element canning reacts with the water used as the coolant as shown in the following equation:

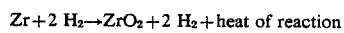

$$Zr + 2 H_2 \rightarrow ZrO_2 + 2 H_2 + \text{heat of reaction}$$

In TMI-2 (Harrisburg), for example, such a reaction resulted in the generation of considerable quantities of hydrogen and consequently to an explosion in the reactor containment.

It is known that hydrogen can burn continuously or may build up to form explosive mixtures, thus resulting in considerable danger, since in such a serious accident in which a considerable zirconium/water reaction occurs, increased quantities of fission products are simultaneously released from the reactor core into the reactor containment. The release of fission products from a damaged containment into the environment is more disastrous the earlier this occurs after the accident begins. Ths first few hours play a decisive role owing to the low half-lives of the fission products and the possibility of evacuating the population. An explosion or detonation must at all costs be avoided during this phase.

Now if excessive heating of the reactor core occurs in case of a LOCA due to the inadequate functioning or failure of the coolant system, the water present in the reactor pressure vessel will react with the zirconium in the afore-mentioned zirconium/water reaction during which considerable quantities of hydrogen build up rapidly. A mixture of steam and hydrogen then escapes from the site of rupture or leakage in the primary circuit. The coolant system will already be substantially pressureless at this time or will drop to zero pressure at least after a first accident phase, so that the rates of escape are lower than in the cases or phases studied hereinbefore in which no melt-down of the reactor core was assumed so that a large amount of hydrogan reaches the reactor containment in spite of the lower rates of escape. In subsequent phases of the melt-down, considerable quantities of hydrogen also form from the additional metal/water and molten mass/concrete reactions. The explosivity of the atmosphere in the reactor containment (i.e. the time, place, dimensions and danger potential) is highly dependent on the hydrogen production and the entire or even local concentration of hydrogen and oxygen wihtin the reactor containment. The generation of hydrogen occurs within a period of minutes to a few hours at the most, whilst distribution and mixing within the containment might possibly require longer.

There have been various suggestions for avoiding excessive pressure breakdown of the reactor containment even if the event of reactor melt-down, i.e. even in the event of hyrogen combustion. According to one of these proposals, the reactor containment is connected to a secondary container so that the atmosphere in a controlled manner out of the reactor containment through appropriate filter purification units into the outside atmosphere, although this is extremely problematical if there is a massive release of fission products.

The secondary container may be designed as a full-pressure container or as a pressure reduction system. The filter purification units could be provided as an independent measure for the reactor containment or as a supplement for the secondary container. The underlying idea, either additionally or alternatively, especially for plants already in operation, is to render a combustible or explosive atmosphere safe by inhibitory additives. Such an inhibitory additive is a fire-fighting substance such as Halon, for instance. It is also provided in a few types of nuclear power plants to render the reactor containment inert even during normal operation, the containment being filled with nitrogen instead of air, for example, thus resulting in considerable drawbacks during normal operation.

Even if an excessive pressure load in the event of reactor melt-down were taken into consideration in view of the design of the reactor containment, a solution is not completely satisfactory, since the long-term integrity of the reactor containment and the surrounding reinforced concrete shell cannot reliably be estimated. In particular, the possible local temperature loads which fluctuate greatly as a function of time may lead to hair cracks or may damage seals, thereby reducing the maximum pressure load of the reactor containment or reinforced concrete shell. In addition, a brief undesirable local or integral vacuum may possibly occur subsequently if there is sudden combustion or excessive pressure. Another aspect is the danger to safety equipment, in particular damage to electrical insulations; this is the reason why the prevention of fires in the system is of primary importance after an accident. This may possibly cause complete melt-down of the reactor core to be avoided. In any case, failure of the reactor containment must be prevented for as long as possible (as in the TMI-2 accident).

SUMMARY OF THE INVENTION

The object of the invention is to provide a process for avoiding or reducing the danger of a system and the surroundings thereof by chemically and/or physically reacting substances and release of pollutants, in particular due to the combustion of hydrogen in the reactor containment of a nuclear power plant and/or by the release of fission products therefrom.

This object is accomplished in accordance with the invention by the measures cited in the characterising clause of the main patent claim.

Advantageous further developments of the subject matter of the invention are set forth in the subclaims.

In accordance with the basic concept of the invention, the reactive substances are kept separately or are separated and subsequently kept separately in the event of an accident in a system indicating in particular a danger to the system to avoid in this way a possible reaction. This means, for instance, initially preventing the generation of explosive or combustible gas mixtures.

If it should be impossible to achieve adequate separation of the reactive substances so that a reaction between these substances does occur, an alternating pressure load in the space surrounding the system may occur. In the event of combustion, excessive pressure initially builds up and is subsequently followed by a vacuum after heat dissipation and condensation of the substance generated during the reaction. Owing to the fact that, in accordance with an advantageous further development of the invention, an inert gas is supplied into the space surrounding the system prior, during or subsequent to the reaction such that the vacuum can be compensated at least in part, the alternating pressure load can be entirely or at least substantially prevented.

A study of the course of accidents in nuclear power plants carried out within the scope of the invention has shown that not only the formation and distribution of hydrogen, but also that of oxygen must be taken into consideration as well.

The application of the process in accordance with the invention to nuclear reactors advantageously utilises the fact that air and thus oxygen are displaced out of areas in the reactor containment or the interior of the containment. If this automatic accident-specific process is inadequate, an inert gas can be supplied to the reactor containment to support it. This is preferably accomplished at the earliest possible time so that the entire quantity of oxygen inside the reactor containment is already greatly reduced before considerable amounts of hydrogen are released from the reactor core, the primary coolant circuit or subsequently from the reaction with the bottom coolant and/or the concrete foundation.

The areas of the reactor containment into which the oxygen is displaced during the first phase of the accident, i.e. prior to the onset of the metal/water reaction (e.g. zirconium), are advantageously constructed to be almost completely separate (pressure reduction system) or at least clearly separate (equipment/operational areas in the full-pressure reactor containment). There already exist or can be provided appropriately in the case of so-called alternative concepts with a secondary (auxiliary) reactor containment and/or filter units.

In accordance with an advantageous further development of the process in accordance with the invention, stop means are provided for preventing the oxygen-containing atmosphere prevailing in or introduced into the second area from reaching the first hydrogen-containing area.

It is advantageous within the scope of the invention to prevent those measures which are provided for "malfunctions accounted for" which, however, are disadvantageous in case of serious "non-considered malfunctions", since they cause mixing or in addition may even trigger the reaction (e.g. ignition) of reactive substances or may discharge greater quantities of pollutants from the system, particularly fission products from nuclear power plants. It may even prove necessary to take measures diametrically opposed to those provided for "malfunctions accounted for". The following are typical examples:

1. non-mixing of the atmosphere in the space surrounding the system
2. additional supply of gas (e.g. inert gas or steam)
3. evauacation of atmosphere or reversal of oriented leaks
4. premature venting of the atmosphere.

It is of importance within the framework of the invention that in the event of explosion or combustion in a system attention be paid not only to the aspect of the resultant excess pressure and the associated excess pressure and temperature load on the space surrounding the system, e.g. the reactor containment, but also to the fact that a vacuum forms in the interior of the reactor containment of a nuclear power plant when the oxygen in the air bonds to the hydrogen and the resultant stream condenses by the dissipation of heat. The process in accordance with the invention is also adapted to counteract a vacuum load by introducing an inert gas into the system after the occurrence of an accident, particularly shortly before or after the reaction. If a hot gas, e.g. steam, is supplied, an undesirable thermal tension in the material may possibly be counteracted at the same time, particularly when the supply of gas is activated shortly before the combustibility limit is reached.

In view of other nuclear technical concepts or entirely different technical systems also associated with a source of considerable potential danger it may become necessary depending on the progress and characteristics of serious accidents to slightly alter the object of the process in accordance with the invention. For instance, the progress of the accident, in particular in chemical plants, can be characterised by the fact that pollutants initially escape from the process system and vent to the atmosphere of the container surrounding the system before encountering a reactive partner subsequently. In this case, the reactant (e.g. air) which exists anyway and contains the pollutants would have to be transferred in time into a second separate area and the atmosphere in the first area replaced by an inert gas in accordance with the invention.

It is also feasible that the accumulation of the pollutants itself may cause a violent, e.g. physical reaction (the critical mass of fissiionable elements) which in turn would consequently endanger the system and the surroundings thereof due to additional or different chemical and/or biological pollutants, for example. In this case, the reaction may possibly be stopped by transferring the initially released products by flushing into the first, especially hazardous area a substance which prevents or at least delays or inhibits the reaction. In the case of imminent nuclear reactions, this can be effected by flushing with a neutron-absorbing gas (e.g. boron-containing steam), for example, analogous to the inert gas used in chemical reactions.

On the whole, the process in accordance with the invention thus constitutes an integrated and graduated set of measures, for warding off danger to technical systems (and the surroundings thereof) which are characterised by a a particular danger potential due to the occurrence of pollutants with the additional possible accumulation of reactive partners.

The subject matter of the invention can be employed for many technical systems which under certain circumstances may differ considerably and which have the following common characteristics:

1. Serious accidents are associated with danger to the system such that a controllable condition can no longer be reliably ensured during the further course.
2. This situation can result in a direct and serious danger to the surroundings, in particular to the population.
3. During the course of the accident, reactive mixtures and toxic pollutants occur in succession or simultaneously so that the most effective non-interaction becomes necessary (both separation of the reactive substances from one another, and of the remaining reactive substances from the pollutants).

In the light of current experience or the theoretical analysis of very serious accidents, it is known that such situations cannot be excluded in the area of chemical plants and nuclear power plants, for example. On the basis of the multiplicity and variation of technical systems with a considerable potential danger it is impossible to explain the process in accordance with the invention for all conceivable systems and accidents. Representative of many, therefore, a few examples will be presented in excerpts using "light-water reactor" (LWR) type nuclear power plants, here classified as the pressurised-water reactor (PWR) and the boiling-water reactor (BWR) both of the conventional type and according to the alternative concepts without either intending to or in fact restricting the subject matter of the invention.

BRIEF DESCRIPTION OF THE DRAWING

The subject matter of the invention will now be explained in more detail in the following with reference to an embodiment and to the drawings, additional features of the invention becoming evident from the following description.

DESCRIPTION OF THE PREFERRED EMBODIMENT

Figure 1:
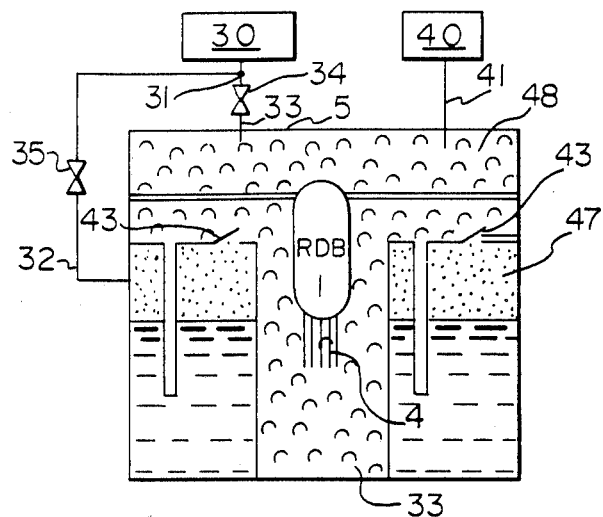
FIG. 1 is a schematic illustration of a boiling-water reactor with a pressure reduction system designed in accordance with the invention.
Figure 2:
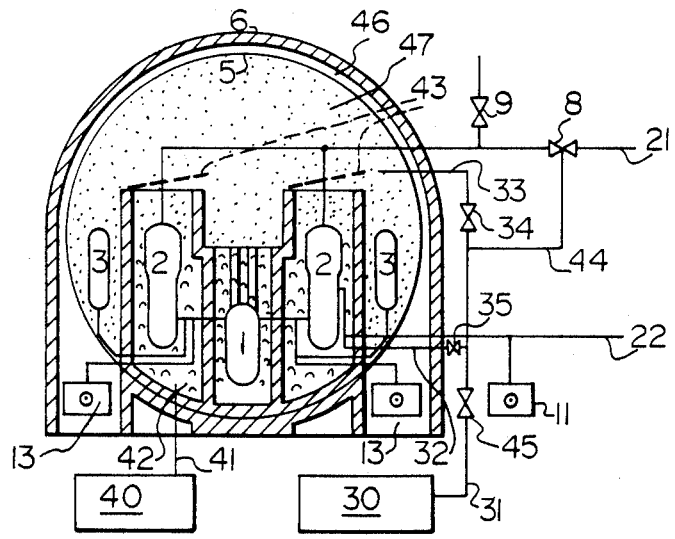
FIG. 2 is a schematic illustration of a pressurised-water reactor system comprising a full-pressure reactor containment equipped in accordance with the invention.
Figure 3:
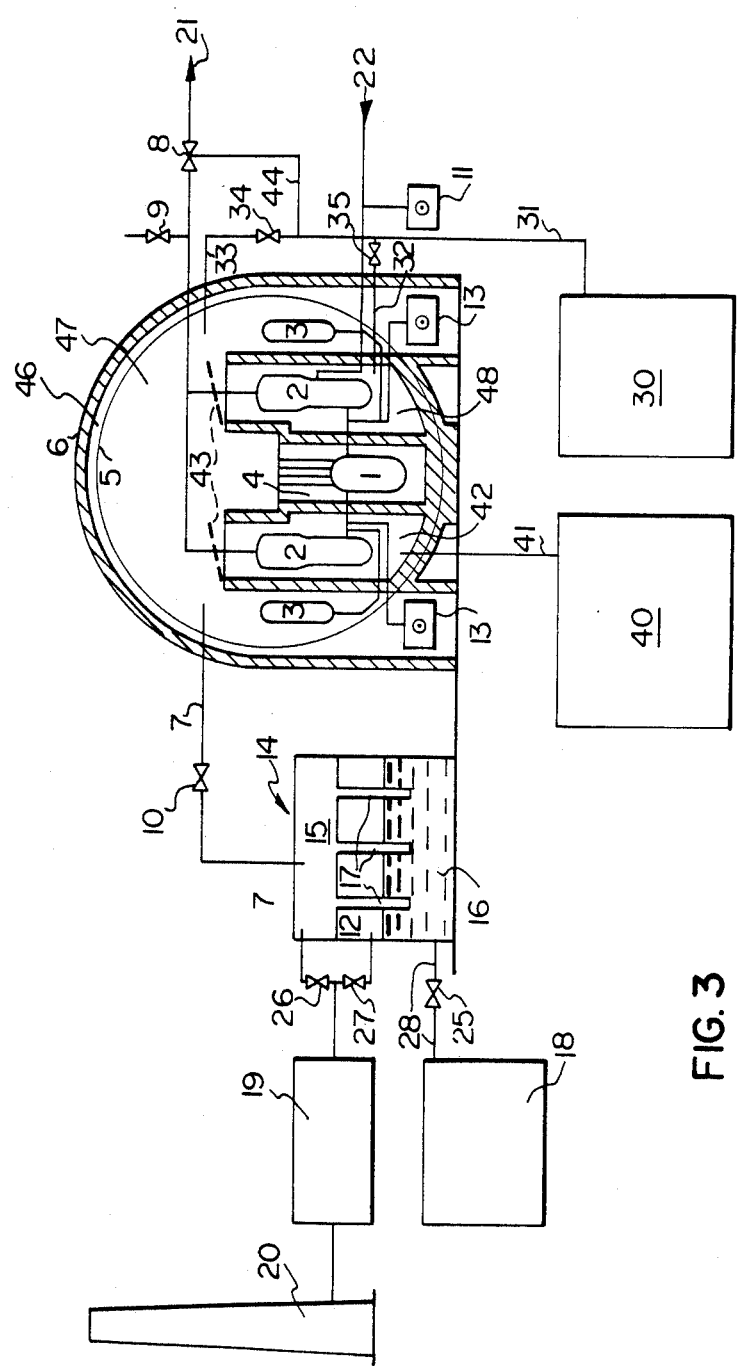
FIG. 3 is a schematic illustration of a pressurised-water reactor system comprising a full-pressure reactor containment and secondary means which is equipped for the invention.

Both reaction systems in FIGS. 1 and 2 have previously included only a single first reactor containment which, however, can be supplemented by other systems, in particular another reactor containment and/or special filter systems as has been discussed for future alternative concepts. Studies up to now have dealt substantially with preventing an excess pressure failure of the inherent (first) reactor containment. The process in accordance with the invention can be employed for all systems by virtue of the comparatively minor changes and supplementations contained in FIG. 3.

In the inventor's opinion, this applies to the entire spectrum of possible accidents, although for the sake of limiting the description only a justifiable case and here only the example of a substantially complete melt-down was chosen, since this constitutes the supposedly most critical case.

Reference is made to the pertinent literature (safety reports, risk studies of nuclear power plants, etc.) for technical details concerning nuclear power plants and the already installed or planned safety means, the probability of occurrence, the progress and consequences of serious accidents without the use of the process in accordance with the invention.

A reactor pressure vessel 1 containing the nuclear reactor in which the nuclear reactions required for energy production proceed in a controlled manner is located in a reactor containment 5 which is surrounded by a reinforced concrete shell 6. Moreover, accumulators 3 for an emergency and residual heat removal (RHR) system are located in the reactor containment 5. These accumulators 3 are connected to an emergency and residual heat removal (RHR) system 13 which includes the control elements required to control this system. A reactor scramming system 4 located close to the reactor pressure vessel 1 serves to make rapid reactor shut-down possible.

In so-called "malfunctions accounted for", scramming systems, emergency and RHR systems serve to convert the system to a safe condition without discharging an unlawful dose of radiation into the surroundings. If such systems fail, overheating of the core must be expected in the reactor pressure vessel 1 and as a result greater amounts of hydrogen and fission products must be expected in the reactor containment 5 then the reactor was designed to withstand. In the event of partial or complete core melt-down, failure of the reactor containment 5 cannot be excluded either. Core melt-down is characterised by the rapid and intense generation of hydrogen, in particular as a result of so-called metal/-water reactions and simultaneously as a result of the high temperatures and destruction of the so-called internal safety barriers (the fuel element canning, primary coolant system) by the release of considerable quantities of fission products from the fuel or the molten mass into the atmosphere of the reactor containment 5. The containment, the filter systems and the hydrogen removal systems have hitherto not been designed for and in part are incapable of adapting to such situations so that the disastrous effects to the system and the surroundings thereof would not be able to be prevented. The improvement, sophistication and application of the various measures of the process in accordance with the invention can substantially master this serious accident or at least drastically reduce the effects on the surroundings.

To this end, areas of the primary, i.e. the inherent, first reactor containment 5 must initially be able to be separated fluid-dynamically if need be by suitable devices (e.g. controllable flaps 43) or an auxiliary, secondary container 14 must be adapted to be connected. This may be designed in a known manner as a full-pressure container or as a pressure reduction system as shown by way of example by the pressure reduction system 14 in FIG. 3. (Such measures have already been discussed as so-called alternative concepts). Departing from previous known studies, this container is now supposed to serve not only to deal with the excess pressure which accumulates in the primary reactor containment, but primarily to separate the reactive components oxygen and especially hydrogen by flushing the primary reactor containment with an inert gas and separating it before large quantities of hydrogen, in particular, and fission products are released into the atmosphere of the primary reactor containment.

One proposal for the technical design and construction of the process in accordance with the invention for use in light-water reactors is described in the following:

A secondary container 14 containing a pressure reduction system is located external to the reactor containment 5. The secondary container 14 includes a chamber 15 in fluid-dynamic connection via immersion pipes 17 with an hydraulic seal 16.

At least one connecting line 7 is provided between the interior of the reactor containment 5 and the secondary container which opens at one end into the interior of said reactor containment 5 and at the other end into the chamber 15. At least one control valve 10 is provided in the connecting line 7 by means of which the flow through the connecting line 7 can be selectively opened or closed.

Both the chamber 15 and the space 12 outside of the hydraulic seal are connected fluid-dynamically via valves 26 and 27, respectively, for example, to a filter unit 19 which in turn is connected fluid-dynamically to a chimney 20. The hydraulic seal 16 can be connected via a connecting line 28 to a waste water processing unit 18. A valve 25, for example, is provided in the connecting line 28.

Water is supplied to the steam generators 2 via connecting line 22 by main feed-water pumps (not shown). In the event that the main feed-water pumps do not operate properly or fail completely, an emergency feed-water system 11 is provided which is connected to connecting line 22 to be able to supply sufficient quantities of water to the steam generators 2.

The steam produced by the steam generators 2 is conveyed through a connecting line 21 to turbines (not shown). A live steam quick-action stop valve 8 is provided in this connecting line 21 and serves to interrupt the supply of live steam to the turbines if the need arises. It is possible by means of a live steam safety valve 9 disposed upstream of the live steam quick-action stop valve 8 to reduce the pressure in the steam generators 2 by the eduction of live steam.

To carry out the process in accordance with the invention, connecting lines 32 and 33 are provided in accordance with the illustrated drawing which lead from outside the reactor containment 5 into the interior thereof. The connecting lines 32 and 33 are connected to a source 30 of an inert gas via control valves 34 and 35 and a feed line 31. Inert gas can be conveyed from the source 30 into the interior of the reactor containment 5 through the communication system consisting of parts 31 to 35. It goes without saying, of course, that additional connecting lines and control valves leading into the containment may be provided if desired.

By selectively controlling the valves 35 adn 34 it is possible to regulate that quantity of gas which is to be supplied to different sites within the reactor containment 5, these sites corresponding to the outlets of the connecting lines 32 and 33.

It is advisable for reasons of safety to provide an emergency feed system 40 which is connected with the interior or the reactor containment 5 via a connecting line 41. When the emergency feed means is actuated, gas flows into the containment 5 at the outlet 42 of the connecting line 41.

The following illustrates how possible danger to the reactor containment is avoided in accordance with the invention in case of a LOCA. The control valves, 10, 34 and 35 are opened after the LOCA occurs. Opening the control valves 34 and 35 permits inert gas to flow from the inert gas source 30 through the connecting lines 31, 32 and 33 into the interior of the reactor containment 5.

In principle, steam from the secondary circuit of a pressurised-water reactor could also be used as an inert gas supply and conveyed through the line 44 to the inert gas feed system 30. This causes the pressure in the atmosphere prevailing in the interior of the containment to increase so that the atmosphere located therein can be conveyed through the line 7 and the open valve 10 into chamber 15 of the secondary container. The atmosphere which overflows from the interior of the reactor containment 5 into the secondary container 14 contains not only the air originally present in the containment, but also any steam and possibly small amounts of hydrogen released in conjunction with the LOCA. After a certain amount of time, the quantity of air in the containment interior will have declined to such an extent that there is no longer any danger that the hydrogen, for example, now being released rapidly and in considerable quantities can ignite and burn so as to endanger the system by combustion, explosion, semi-detonation or detonation.

Nonetheless, if released hydrogen burns with the oxygen still in the containment, a pressure drop in the atmosphere within the containment will occur so that, if necessary, this can be counteracted by introducing more inert gas. At this moment in the course of the accident, it is advantageous if the pressure of the atmosphere within the reactor containment 5 is maintained at a level not exceeding the pressure of the atmosphere surrounding the reactor containment 5. To this end, it may be necessary to close the control valve 10 prematurely or after a delay, to provide an orifice, to design the valves as one-way valves or to possibly increase the pressure in the outer so-called annular space 46 before combustion. The relative vacuum prevailing inside the reactor containment 5 will prevent any contaminated or polluted atmosphere from gaining access to the exterior because leaks will be directed inwardly.

The hydrogen in the atmosphere which at the beginning of the accident or during the long-term phase passes into the secondary container 14 due to inwardly directed leaks of the primary containment 5 from 46 is condensed out of this atmosphere by the hydraulic seal 16 and is supplied to the waste water processing unit 18 at a desirable time. The atmosphere remaining in the gaseous state can be vented to the outside atmosphere through a filter unit 19 upstream of a chimney 20 after a period of time whose duration is dependent on the radioactive intensity of this atmosphere.

In special cases, e.g. when a low pollutant content (fission products in this case) still exits in an initial phase on the basis of analysis (measurement, simulation), but an especially unfavourable situation must be expected later, or damage is visible on the secondary containment, it can be advantageous in accordance with the invention, contrary to existing opinion, to release the atmosphere through the filter unit 19 and chimney 20 early.

In principle, the advantages in accordance with the invention can also be exploited in an already operative power plant without having to supplement it with auxiliary containments and filter units, i.e. by utilising already installed means such as the primary reactor containment and normal accident filters, if these are supplemented by barrier means 43. For instance, the function of a secondary reactor containment is taken over by a barrier area 47 of the primary reactor containment 5. In this case, the condensation of steam which has passed into the secondary area 47 could be effected, for example, by externally cooling the containment in the case of the pressurised-water reactor (FIG. 2) or by providing spray systems in the interior. These areas which are directed fluid-dynamically and/or separated in a controllable manner are preferably the equipment areas 48 on the one hand and the operational areas 47 on the other hand in the full-pressure containment of a presurized-water reactor (FIG. 2); said spaces can be separated by overflow flaps 43, for example, at the tops of the steam generator towers. In the case of the pressure reduction system as designed for boiling-water reactors (FIG. 1), these spaces (after sophistication) are the areas of the pressure chamber 48 and the condensation chamber 47.

It is also feasible to provide the supplements in the primary reactor containment and to make the expansion by attaching a second containment in the sense of a graduated system.

The realisation of the second reactor containment in the form of a pressure reduction system can be expected to have not only financial advantages but also the advantages that both an almost continuous flushing of the primary containment with steam becomes possible and that at the same tine the hydraulic seal can be utilised as a condensing gas scrubber, thereby creating especially favourable prerequisites both as far the pressure regulation in both reactor containments and as far as the employment of fission product purification filters are concerned.

What is claimed is:

1. A process for precluding or reducing the danger to a non-preinerted nuclear reactor containment system and the enclosed equipment resulting from fission products, and hydrogenhydrogen deflagrations or detonations in the containment atmosphere, which containment atmosphere contains air and hydrogen which hydrogen is generated during a loss of coolant accident, comprising after said loss of coolant accident the steps of:

transferring at least one portion of the air within the containment volume from a part where the release of hydrogen occurs, into at least one area where no hydrogen is released, said one portion of the air is not containing amounts of hydrogen sufficient for a deflagration, keeping the hydrogen atmosphere enclosed within the part of the containment volume where the release of hydrogen occurs and in presence of only another portion of the air, which remains after the transfer of the one portion of the air and which has therefore a small oxygen content insufficient to cause catastrophic oxygen-hydrogen reaction in the one part of the containment volume.

2. The process according to claim 1, wherein said transferring step includes transferring said at least one portion of the air within the containment volume into said at least one area which is in the interior of the containment system.

3. The process according to claim 1, wherein said transferring step includes transferring said at least one portion of the air within the containment volume into said at least one area which is comprised by the free atmosphere.

4. The process according to claim 1, further comprising the steps of providing at least one auxiliary container comprising said at least one area and establishing a fluid-dynamic connection between said at least one area and said auxiliary container.

5. The process according to claim 4, further comprising the step of interrupting said fluid-dynamic connection after said at least one portion of air having been transferred to the auxiliary container.

6. The process according to claim 1, further comprising the step of supplying an inert gas to the containment atmosphere during the transfer of said at least one portion into said at least one area.

7. The process according to claim 6, wherein said supplying step includes supplying said inert gas into that portion of the containment volume where the release of hydrogen occurs.

8. The process according to claim 1, further comprising the step of supplying an inert gas after the transfer of said at least one portion into said at least one area.

* * * * *